US012718156B2

(12) United States Patent
Fernandes et al.

(10) Patent No.: US 12,718,156 B2
(45) **Date of Patent: *Aug. 25, 2026**

(54) ACTIVE NOTIFICATION USING TRANSPORTATION SERVICE PREDICTION

(71) Applicant: Uber Technologies, Inc., San Francisco, CA (US)

(72) Inventors: Neil Chagas Fernandes, San Francisco, CA (US); Aditya Somani, Rajasthan (IN); Adnan Akil, Irvine, CA (US); Pablo Bellver, Redwood City, CA (US); Jieying Chen, San Mateo, CA (US); Archisman Roy, San Francisco, CA (US); Gustavo Bagdadi de Castro, San Francisco, CA (US); Norbert Y. Hu, San Francisco, CA (US); Talal Toukan, San Francisco, CA (US); Lu Huang, Sunnyvale, CA (US); Yuh-Jie Eunice Chen, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,525

(22) Filed: Sep. 30, 2024

(65) Prior Publication Data

US 2025/0021896 A1 Jan. 16, 2025

Related U.S. Application Data

(63) Continuation of application No. 18/490,322, filed on Oct. 19, 2023, now Pat. No. 12,182,738, which is a (Continued)

(51) Int. Cl.
*G06Q 10/02* (2012.01)
*G06N 20/00* (2019.01)
(Continued)

(52) U.S. Cl.
CPC ............ *G06Q 10/02* (2013.01); *G06N 20/00* (2019.01); *G06Q 10/04* (2013.01);
(Continued)

(58) Field of Classification Search
CPC .... G06Q 10/02; G06Q 10/04; G06Q 30/0631; G06Q 50/30; G06N 20/00; H04W 4/025
(Continued)

(56) References Cited

U.S. PATENT DOCUMENTS

| | | | |
|---|---|---|---|
| 8,825,383 | B1 | 9/2014 | Kirmse et al. |
| 8,831,879 | B2 | 9/2014 | Stamm et al. |

(Continued)

FOREIGN PATENT DOCUMENTS

| | | | |
|---|---|---|---|
| EP | 3690403 | A1 | 8/2020 |
| WO | WO-2020081576 | A1 | 4/2020 |
| WO | WO-2022067307 | A1 | 3/2022 |

OTHER PUBLICATIONS

"A secure and Efficient Location-based Service Scheme for Smart Transportation" Published by Elsevier (Year: 2019).*

(Continued)

*Primary Examiner* — Zeina Elchanti
(74) *Attorney, Agent, or Firm* — Schwegman Lundberg & Woessner, P.A.

(57) ABSTRACT

Systems and methods of generating active notifications for users of a networked computer system using transportation service prediction are disclosed herein. In some example embodiments, a computer system uses a prediction model to generate a transportation service prediction for a user based on an identification of the user, location data for the user, prediction time data, and historical user data for instances of the user using the transportation, and then causes a notification to be displayed on a computing device of the user based on the transportation service prediction, with the
(Continued)

notification indicating a recommended use of the transportation service in association with the place for the time of day and the day of the week, and the notification comprising a selectable user interface element configured to enable the user to submit an electronic request for the recommended use of the transportation service.

20 Claims, 13 Drawing Sheets

Related U.S. Application Data continuation of application No. 16/948,528, filed on Sep. 22, 2020, now Pat. No. 11,816,603.

(51) Int. Cl.
*G06Q 10/04* (2023.01)
*G06Q 30/0601* (2023.01)
*G06Q 50/40* (2024.01)
*H04W 4/02* (2018.01)

(52) U.S. Cl.
CPC ......... *G06Q 30/0631* (2013.01); *G06Q 50/40* (2024.01); *H04W 4/025* (2013.01)

(58) Field of Classification Search
USPC .............................................................. 705/5
See application file for complete search history.

(56) References Cited

U.S. PATENT DOCUMENTS 8,855,684 B2 10/2014 Bellver et al.
8,949,013 B2 2/2015 Yang et al.
9,002,636 B2 4/2015 Udeshi et al.
9,146,114 B2 9/2015 Stamm et al.
9,146,116 B1 9/2015 Champaneria et al.
9,147,001 B1 9/2015 Brewington et al.
9,310,211 B1 4/2016 Kirmse et al.
9,390,150 B1 7/2016 Champaneria et al.
9,449,053 B2 9/2016 Yang et al.
9,587,947 B2 3/2017 Stamm et al.
9,910,885 B1 3/2018 Champaneria et al.
10,168,155 B2 1/2019 Stamm et al.
10,169,421 B1 1/2019 Brewington et al.
10,332,019 B2 6/2019 Yang et al.
10,685,016 B1 6/2020 Champaneria et al.
10,891,287 B1 1/2021 Champaneria et al.
10,996,057 B2 5/2021 Stamm et al.
11,816,603 B2 11/2023 Fernandes et al.
2013/0344899 A1 12/2013 Stamm et al.
2013/0345953 A1 12/2013 Udeshi et al.
2013/0345957 A1 12/2013 Yang et al.
2013/0345971 A1 12/2013 Stamm et al.
2014/0057659 A1 2/2014 Udeshi et al.
2014/0074535 A1* 3/2014 Woo-Kwan-Chung ...................... G06Q 10/1093 705/7.19
2014/0082062 A1 3/2014 Bellver et al.
2014/0350843 A1 11/2014 Stamm et al.
2015/0024784 A1 1/2015 Bellver et al.
2015/0066683 A1 3/2015 Azose
2015/0073693 A1 3/2015 Yang et al.
2015/0153194 A1 6/2015 Udeshi et al.
2015/0354963 A1 12/2015 Stamm et al.
2016/0321555 A1 11/2016 Yang et al.
2017/0122768 A1 5/2017 Stamm et al.
2019/0052728 A1* 2/2019 Cheng ..................... H04L 67/62
2019/0113344 A1 4/2019 Stamm et al.
2019/0171988 A1 6/2019 Kwatra et al.
2020/0160718 A1 5/2020 Saleh
2020/0363220 A1* 11/2020 Simoudis ........... G06Q 30/0261
2021/0082075 A1 3/2021 Spielman et al.
2021/0192420 A1* 6/2021 Spielman ................. G06N 5/01
2021/0239469 A1 8/2021 Stamm et al.
2022/0092484 A1 3/2022 Fernandes et al.
2024/0046164 A1 2/2024 Fernandes et al.

OTHER PUBLICATIONS

"U.S. Appl. No. 16/948,528, Corrected Notice of Allowability mailed Mar. 31, 2023", 13 pgs.
"U.S. Appl. No. 16/948,528, Examiner Interview Summary mailed Dec. 23, 2022", 2 pgs.
"U.S. Appl. No. 16/948,528, Non Final Office Action mailed Aug. 12, 2022", 18 pgs.
"U.S. Appl. No. 16/948,528, Notice of Allowance mailed Mar. 22, 2023", 10 pgs.
"U.S. Appl. No. 16/948,528, Notice of Allowance mailed Jul. 19, 2023", 10 pgs.
"U.S. Appl. No. 16/948,528, Response filed Jan. 12, 2023 to Non Final Office Action mailed Aug. 12, 2022", 17 pgs.
"U.S. Appl. No. 16/948,528, Response filed Jul. 19, 2022 to Restriction Requirement mailed May 19, 2022", 10 pgs.
"U.S. Appl. No. 16/948,528, Restriction Requirement mailed May 19, 2022", 6 pgs.
"U.S. Appl. No. 18/490,322, 312 Amendment filed Sep. 25, 2024", 9 pgs.
"U.S. Appl. No. 18/490,322, Non Final Office Action mailed May 3, 2024", 19 pgs.
"U.S. Appl. No. 18/490,322, Notice of Allowance mailed Aug. 14, 2024", 10 pgs.
"U.S. Appl. No. 18/490,322, Response filed Jun. 27, 2024 to Non Final Office Action mailed May 3, 2024", 15 pgs.
"International Application Serial No. PCT/US2021/071533, International Preliminary Report on Patentability mailed Apr. 6, 2023", 9 pgs.
"International Application Serial No. PCT/US2021/071533, International Search Report mailed Nov. 29, 2021", 4 pgs.
"International Application Serial No. PCT/US2021/071533, Written Opinion mailed Nov. 29, 2021", 7 pgs.
Lan, Shulin, et al., "Online Car-Hailing System Performance Analysis Based on Bayesian Network", 18 pgs.
Noursalehi, Peyman, et al., "Real time transit demand prediction capturing station interactions and impact of special events", (2018).

* cited by examiner

400

| USER | SERVACE INSTANCE | ORIGIN | DESTINATION | BEGIN TIME | DAY | TRANSPORT TYPE |
|---|---|---|---|---|---|---|
| USER-1 | INSTANCE-1 | ORIGIN-1 | DESTINATION-1 | 8:31AM | MONDAY | PRIVATE RIDE |
| | INSTANCE-2 | ORIGIN-1 | DESTINATION-1 | 8:28AM | MONDAY | PRIVATE RIDE |
| | INSTANCE-3 | ORIGIN-2 | DESTINATION-2 | 6:01PM | WEDNESDAY | FOOD DELIVERY |
| | . . . | . . . | . . . | . . . | . . . | . . . |
| | INSTANCE-N | ORIGIN-1 | DESTINATION-1 | 8:34AM | MONDAY | PRIVATE RIDE |

FIG. 4

| PLACE | DAY | TIME PERIOD | FEATURE DATA |
|---|---|---|---|
| PLACE-1 | MONDAY | 12:00AM-1:00AM | $FD\text{-}1_{M12A\text{-}1A}$ |
| | MONDAY | 1:00AM-2:00AM | $FD\text{-}1_{M1A\text{-}2A}$ |
| | MONDAY | 2:00AM-3:00AM | $FD\text{-}1_{M2A\text{-}3A}$ |
| | . . . | . . . | . . . |
| | SUNDAY | 10:00PM-11:00PM | $FD\text{-}1_{SU10P\text{-}11P}$ |
| | SUNDAY | 11:00PM-12:00AM | $FD\text{-}1_{SU11P\text{-}12A}$ |
| PLACE-2 | MONDAY | 12:00AM-1:00AM | $FD\text{-}2_{M12A\text{-}1A}$ |
| | MONDAY | 1:00AM-2:00AM | $FD\text{-}2_{M1A\text{-}2A}$ |
| | MONDAY | 2:00AM-3:00AM | $FD\text{-}2_{M2A\text{-}3A}$ |
| | . . . | . . . | . . . |
| | SUNDAY | 10:00PM-11:00PM | $FD\text{-}2_{SU10P\text{-}11P}$ |
| | SUNDAY | 11:00PM-12:00AM | $FD\text{-}2_{SU11P\text{-}12A}$ |
| . . . | . . . | . . . | . . . |

*FIG. 6*

ACTIVE NOTIFICATION USING TRANSPORTATION SERVICE PREDICTION

CLAIM FOR PRIORITY

This application is a continuation of U.S. application Ser. No. 18/490,322 filed Oct. 19, 2023, which is a continuation of U.S. application Ser. No. 16/948,528 filed Sep. 22, 2020, which is hereby incorporated by reference in its entirety.

TECHNICAL FIELD

Embodiments of the present disclosure relate generally to the technical field of electronic navigation devices and, more particularly, but not by way of limitation, to systems and methods of generating active notifications for users of a networked computer system using transportation service prediction.

BACKGROUND

A networked computer system may be configured to enable users to request transportation services. However, current solutions for enabling a user to request an instance of a transportation service are passive, relying on the user to open a corresponding software application on a computing device and configure a request for the instance of the transportation service. This process is complex, often requiring the user to navigate through several steps to request an instance of the transportation service, even when the instance of the transportation service being requested by the user is similar to other instances of the transportation service previously requested by the user, such as with repeated requests for transportation from the home of the user to the workplace of the user every weekday morning at the same time. As a result of this passive approach, the networked computer system provides an inefficient user interface experience and leads to a waste of computer resources, such as excessive consumption of network bandwidth from excessive pages being loaded on the computing device. The present disclosure addresses these and other technical problems.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates historical user data of, in accordance with some example embodiments.

FIG. 6 illustrates profiles of locations, in accordance with some example embodiments.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for generating active notifications for users of a networked computer system using transportation service prediction. In some example embodiments, a technical solution involves predicting a user's next instance of using a transportation service, and then providing active notification to the user, prompting the user to request the predicted next instance of using the transportation service. As a result of this active approach, the networked computer system provides an efficient user interface experience and reduces the waste of computer resources, such as by reducing excessive consumption of network bandwidth from excessive pages being loaded on the computing device of the user. Additionally, other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

Figure 1:
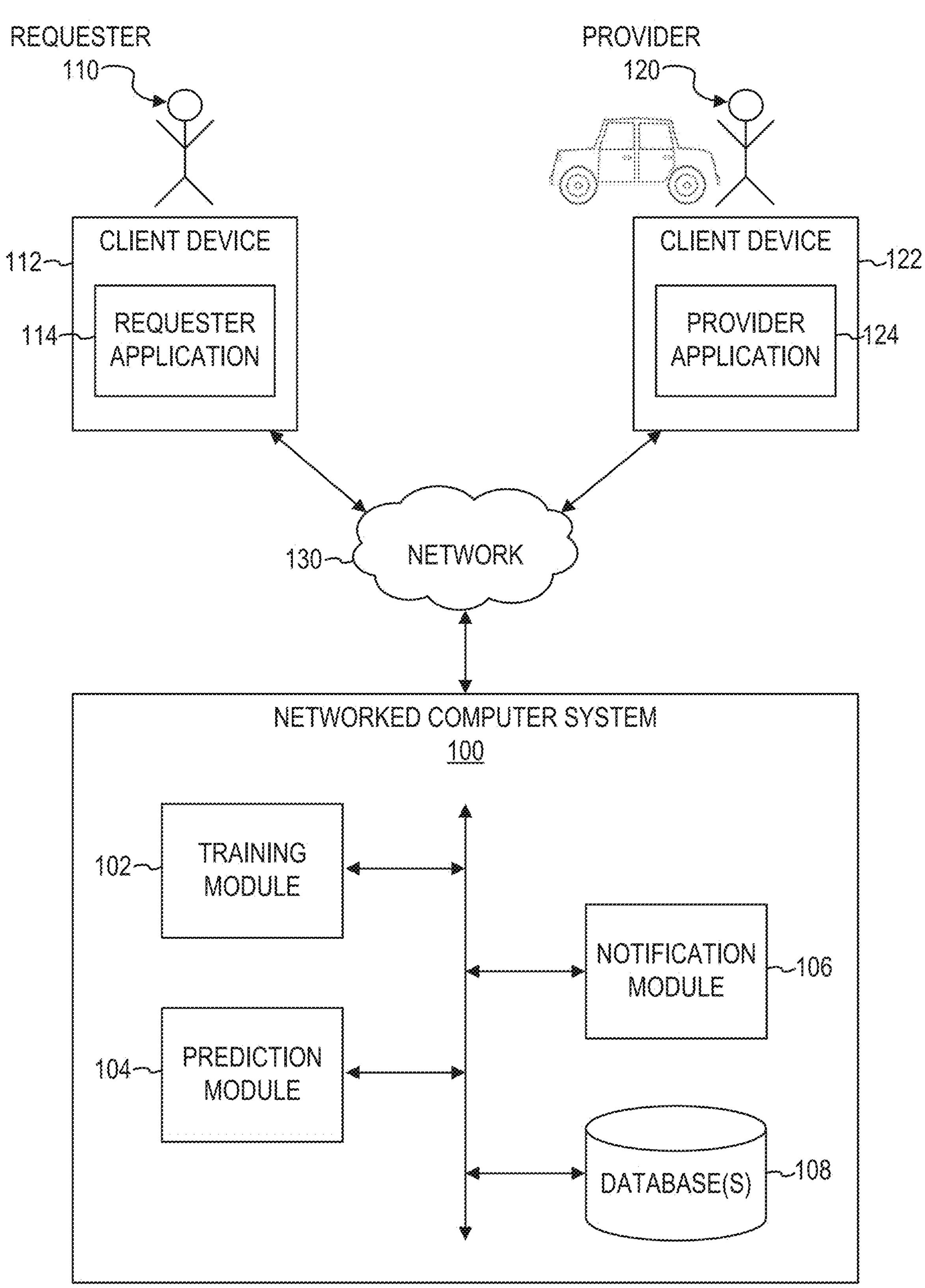
FIG. 1 is a block diagram of a system environment for a networked computer system, in accordance with some example embodiments.

FIG. 1 is a block diagram of a system environment for a networked computer system 100, in accordance with some example embodiments. In some example embodiments, the networked computer system 100 coordinates transportation of persons and/or goods/items for a service requester 110 (e.g., a rider) by a service provider 120 (e.g., a driver of a vehicle). The provider 120 uses a vehicle to provide the transportation to the requester 110.

In some example embodiments, the networked computer system 100 comprises any combination of one or more of a training module 102, a prediction module 104, a notification module 106, and one or more databases 108. These modules and databases are not native components of a generic computer system, and provide structures and functions beyond generic functions of a computer system, as further described below.

In some example embodiments, the modules 102, 104, and 106 and the database(s) 108 reside on a machine having a memory and at least one processor (not shown). In some example embodiments, the modules 102, 104, and 106 and the database(s) 108 reside on the same machine, while in other example embodiments, one or more of the modules 102, 104, and 106 and the database(s) 108 reside on separate remote machines that communicate with each other via a network (e.g., a network 130). It is contemplated that other configurations are also within the scope of the present disclosure.

In some example embodiments, the requester 110 operates a client device 112 that executes a requester application 114 that communicates with the networked computer system 100. The requester 110 operates the requester application 114 to view information about the networked computer system 100, and to make a request for service from the networked computer system 100 for a delivery or transport service ("a trip") of the requester 110 (and, optionally, additional persons) and/or items (e.g., cargo) needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, such as a global positioning system (GPS) component, a wireless networking system, or a combination thereof. For purposes of simplicity, as described herein, the origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends the pick-up location to the requester 110 based on historical trip data associated with the origin location.

According to examples herein, the requester client device 112 transmits a set of data to the networked computer system 100 over a network 130 in response to requester 110 input or operation of the requester application 114. Such data can be indicative of the requester's interest in potentially requesting service (e.g., before actually confirming or requesting the service). For example, the requester 110 may launch the requester application 114 and specify an origin location and/or a destination location to view information from the networked computer system 100 before making a decision on whether to request service. The requester 110 may want to view information about the average or estimated time of arrival for pick up by the provider 120, an estimated time to the destination, a corresponding cost, available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 generates and transmits the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or a WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a service via the requester application 114, the requester application 114 generates data corresponding to a request for the service through the networked computer system 100 (e.g., also referred to herein as a "trip request"). In response to receiving a trip request, the networked computer system 100 determines the average estimated time of arrival (ETA) at the pick-up location of providers 120 whose current location are within a threshold distance of the pick-up location (e.g., providers 120 who are all within one mile of the pickup location). In some embodiments, in response to determining that the requester's ETA at the pick-up location is within a threshold amount of time of the average ETA of nearby available providers 120, the networked computer system 100 uses information from the trip request to match the requester 110 with an available provider 120. Depending on implementation, the trip request can include requester 110 or device information (e.g., a requester identifier, a device identifier), a service type (e.g., vehicle type), and/or selected service option (such as described herein), an origin location, a destination location, a payment profile identifier, a desired departure time, and/or other data. The networked computer system 100 selects the provider 120 from a set of providers, such as based on the provider's current location and status (e.g., offline, online, available) and/or information from the trip request (e.g., service type, origin location, and/or destination location), to provide the service for the requester 110 and transport the requester 110 from the origin location to the destination location. In response to selecting an available provider 120, the networked computer system 100 sends an invitation message to the provider client device 122 inviting the provider 120 to fulfill the trip request.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA.

If, after matching the requester 110 with the available provider 120, the networked computer system 100 determines that the requester's ETA and the provider's ETA at the pick-up location vary by over a threshold amount of time, the networked computer system 100 can reassign the trip to another available provider 120.

The provider 120 operates a client device 122 executing a provider application 124 that communicates with the networked computer system 100 to provide information indicating whether the provider 120 is available or unavailable to provide transportation services to requesters 110. The provider application 124 also presents information about the networked computer system 100 to the provider 120, such as invitations to provide service, navigation instructions, map data, etc. In one example embodiment, the provider application 124 enables the provider 120 to provide information regarding availability of the provider 120 by logging into the networked computer system 100 and activating a setting indicating that the provider 120 is currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, for example, a GPS component, a wireless networking system, or a combination thereof. The provider application 124 further allows the provider 120 to receive, from the networked computer system 100, an invitation message to provide a service for the requesting requester 110, and if the provider 120 accepts, the provider application 124 transmits an acceptance message to the networked computer system 100. The networked computer system 100 can subsequently provide information about the provider 120 to the requester application 114. In another example embodiment, the provider application 124 can enable the provider 120 to view a list of current trip requests and to select a particular trip request to fulfill. The provider application 124 can also receive routing information from the networked computer system 100.

In some example embodiments, the requester client device 112 and provider client device 122 are portable electronic devices such as smartphones, tablet devices, wearable computing devices (e.g., smartwatches), or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., L TE/GSM/UMTS/CDMA/HSDP A, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, present information received from the networked computer system 100 on a requester interface, such as a map of the geographic region, and the current location of the requester client device 112 or the provider client device 122. The applications 114 and 124 running on the requester client device 112 and the provider client device 124 can determine the current location of the respective device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update the database(s) 108 with the availability status. The networked computer system 100 is also configured to receive trip requests from the requester application 114 and create corresponding trip records in the database(s) 108. According to an example embodiment, a trip record corresponding to a trip request can include or be associated with a trip ID, a requester ID, an origin location, a destination location, a service type, pricing information, and/or a status indicating that the corresponding trip request has not been processed. According to one example embodiment, when the provider 120 accepts the invitation message to service the trip request for the requester 110, the trip record can be updated with the provider's information as well as the provider's location and the time when the trip request was accepted. Similarly, location and time information about the service as well as the cost for the service can be associated with the trip record.

In one example embodiment, during the trip, the networked computer system 100 receives information (e.g., periodically) from the provider application 124 indicating the location of the provider's vehicle and/or telematics information (e.g., indications of current speed, acceleration/deceleration, events, stops, and so forth). The networked computer system 100 stores the information in the database(s) 108 and can associate the information with the trip record. In some example embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a trip request through the requester application 114. In one example embodiment, the requester application 114 periodically transmits geospatial location information of the requester client device 112 to the networked computer system 100. The geospatial location information can correspond to a current location data point of the requester client device 112 at an instance in time. Such a location data point can be generated by a location determination module (not shown) in the requester client device 112, such as, for example, a GPS component, a wireless networking system, or a combination thereof.

In some example embodiments, the requester application 114 and the provider application 124 are configured to display map data indicating a specific geographical location of a place, as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 may display, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off the requester 110 associated with the service request, as well as a route from the current location of the provider 120 or the client device 122 of the provider 120 to the specific geographical location of the place associated with the service request. Similarly, the requester application 114 may display, on the client device 112 of the requester 110, a map that includes a graphic element that corresponds to the current location of the requester 110 or the client device 112 of the requester 110 and a graphic element that corresponds to the specific geographical location of the place associated with the service request, as well as a route from the current location of the requester 110 or the client device 112 of the requester 110 to the specific geographical location of the place associated with the service request.

The map data and the navigation instructions are generated based on the specific geographical location of the place associated with the service request. In some example embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 108, and then transmit the geographical location of the place to the requester application 114 and the provider application 124 for use in generating the corresponding map data and navigation instructions that are to be generated and displayed by the requester application 114 and the provider application 124. In other example embodiments, the corresponding map data and navigation instructions are generated by the networked computer system 100 using the geographical location of the place stored in the database(s) 108 of the networked computer system 100 in association with an identifier of the place (e.g., a name of the place, an address of the place), and then transmitted to the requester application 114 and the provider application 124 for display on the client device 112 of the requester 110 and the client device 122 of the provider 120.

In some example embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some example embodiments, the networked computer system 100 is configured to predict a user's next intent with respect to a transportation service. The networked computer system 100 may be configured to predict the user's next instance of using the transportation service, such as predicting the user's next trip to a destination location. As will be discussed in further detail below, the networked computer system 100 may predict the user's next instance of using the transportation service based on repeat behavior of the user, such as the user habitually taking the same trip at substantially the same time every weekday (e.g., the user taking a trip from home to work every weekday morning at some time between 8:00 am and 9:00 am). The networked computer system 100 may also predict the user's next instance of using the transportation service based the user's environment context, such as a destination location (also referred to herein as a "place') to which the user was recently dropped off via use of a transportation service. The networked computer system 100 may then provide active notification to the user, prompting the user to request the predicted next instance of using the transportation service.

In some example embodiments, the training module 102 is configured to train a prediction model that is configured to predict a target user's next instance of using a transportation service of the networked computer system 100, the prediction module 104 is configured to generate a transportation service prediction using the trained prediction model, and the notification module 106 is configured to cause a notification indicating a recommended use of the transportation service to be displayed on a computing device of the target user based on the generated transportation service prediction. The features and functionality of the training module 102, the prediction module 104, and the notification module 106 will be discussed in further detail below.

Figure 2:
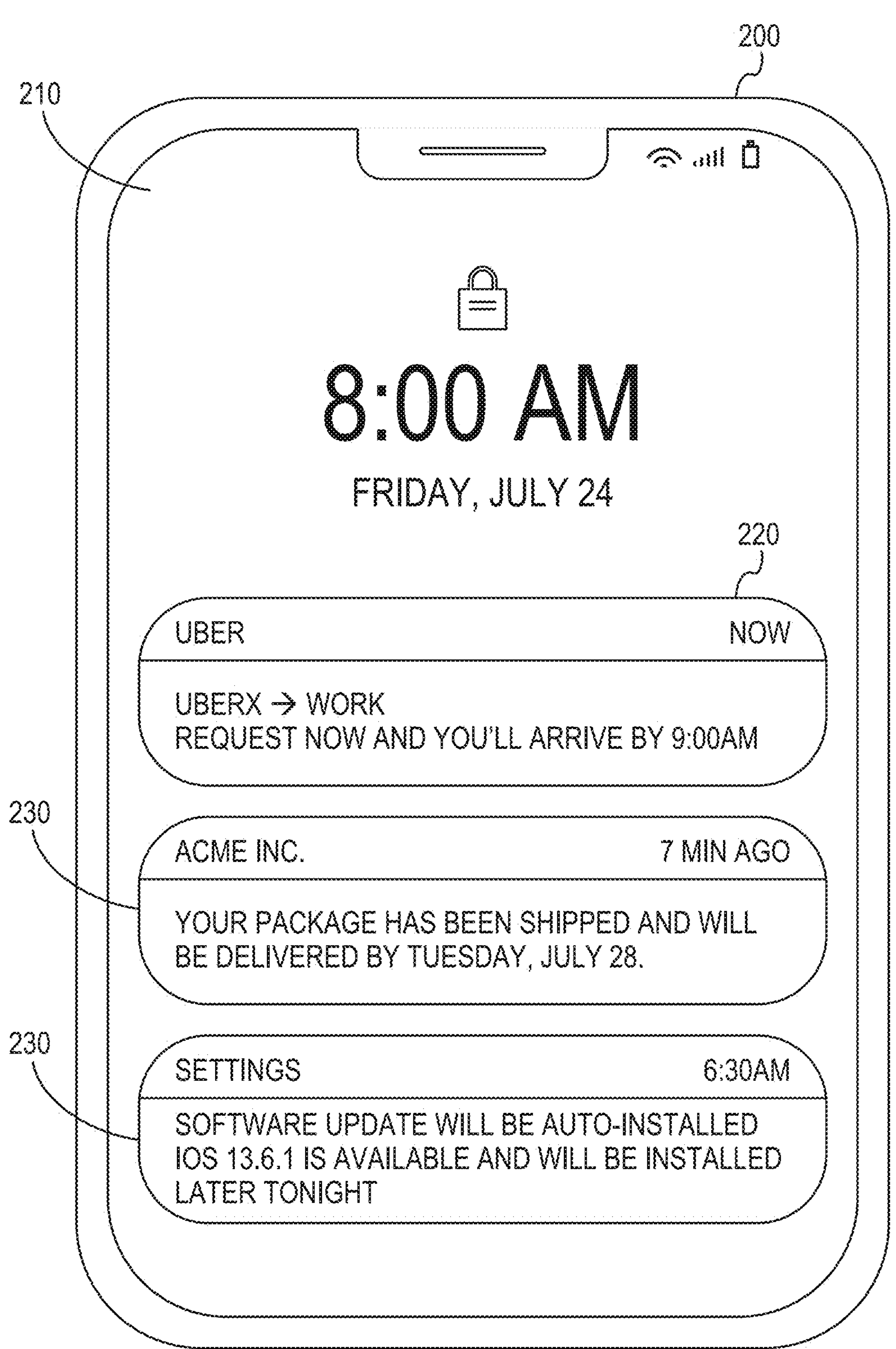
FIG. 2 illustrates a graphical user interface (GUI) within which a notification of a recommended use of a transportation service is displayed, in accordance with some example embodiments.

FIG. 2 illustrates a graphical user interface (GUI) 210 within which a notification 220 of a recommended use of a transportation service is displayed, in accordance with some example embodiments. The GUI 210 is displayed on a computing device 200 of the target user. For example, the GUI 210 may be displayed on the client device 112 of the requester 110. In some example embodiments, the notification 220 is pushed to the computing device 200 for display on the computing device 200. However, it is contemplated that the notification 220 may be transmitted to the computing device 200 using techniques other than push technology.

In some example embodiments, the notification module 106 is configured to cause the notification 220 to be displayed on the computing device 220 in a user interface environment that is external to any software application of the networked computer system 100, such as in a user interface environment that is external to any mobile application of the networked computer system 100. For example, the notification 220 may be displayed on the client device 112 of the requester 110 in a user interface environment that is outside of the requester application 114. In FIG. 2, the notification 220 is displayed on a lock screen of an operating system of the computing device 200 along with other notifications 230 from other online services different from the networked computer system 100. A lock screen is a computer user interface element that is used by the operating system of a computing device to regulate immediate access to the computing device by requiring that the user perform a certain action (e.g., entering a password, performing a certain gesture using a touchscreen of the computing device) in order to receive access to full functionality of the computing device. The notification 220 may alternatively be displayed on a home screen of the operating system of the computing device 200. A home screen is the main screen on a computing device from which the user can access all of the software applications on the computing device, such as via selectable links to software applications.

In some example embodiments, the notification module 106 is configured to cause the notification 220 to be displayed on the computing device within a user interface of a software application of the networked computer system 100, such as within a user interface environment of a mobile application dedicated to the networked computer system 100. For example, the notification 220 may be displayed on the client device 112 of the requester 110 in a user interface environment of the requester application 114.

In some example embodiments, the notification 220 indicates a recommended use of the transportation service based on a transportation service prediction generated by the prediction module 104. The notification 220 may comprise a selectable user interface element configured to enable the target user to submit an electronic request for the transportation service corresponding to the transportation service prediction. For example, in the example shown in FIG. 2, the notification 220 comprises a selectable user interface element that is configured to, in response to its selection by the target user (e.g., selection via a swiping gesture of the notification 220 by the target user), automatically configure an electronic request for the transportation service.

Figure 3:
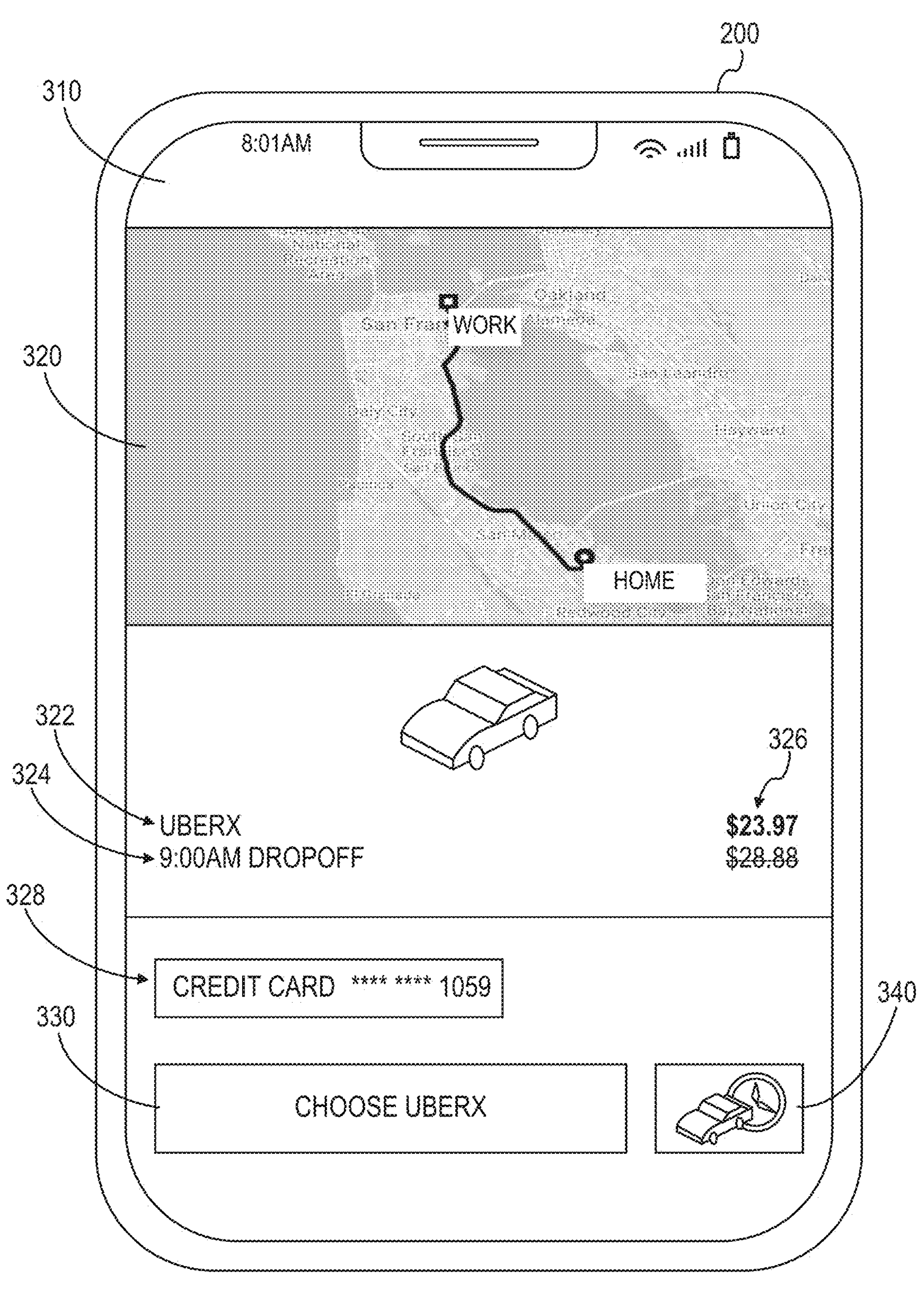
FIG. 3 illustrates a GUI within which an automatically configured electronic request for a transportation service is displayed, in accordance with some example embodiments.

FIG. 3 illustrates a GUI 310 within which an automatically configured electronic request for the transportation service is displayed, in accordance with some example embodiments. In FIG. 3, the target user has selected the selectable user interface element of the notification 220 displayed in FIG. 2, such as by swiping the selectable user interface element of the notification 220, thereby resulting in a visual representation of the automatically configured electronic request being displayed within the GUI 310 in FIG. 3. The visual representation of the automatically configured electronic request comprises elements corresponding to the transportation service prediction, which may include, but are not limited to, a representation 320 of an origin location and a destination location corresponding to the transportation service prediction (e.g., a map showing a route from the origin location to the destination location in FIG. 3), an identification 322 of a type of transportation service corresponding to the transportation service prediction (e.g., private transport service of a person, shared transportation service of different requester users, feed delivery, etc.), a predicted arrival time 324 at a destination location corresponding to the transportation service prediction (e.g., an estimated drop-off time), an estimated price 326 for the instance of using the transportation service corresponding to the transportation service prediction, and a payment method 328 for the instance of using the transportation service corresponding to the transportation service prediction.

In FIG. 3, the GUI 300 also comprises a selectable user interface element 330 configured to, in response to its selection by the target user, submit the request for the instance of using the transportation service to the networked computer system 100 for processing. For example, by simply swiping the selectable user interface element 330, the target user may trigger the submission of the automatically configured electronic request corresponding to the transportation service prediction to the networked computer system 100 for processing. The target user may also modify the details of the electronic request, such as by selecting a user interface element 340 configured to enable the target user to edit elements of the electronic request (e.g., changing the origin location, changing the destination location, changing the type of transportation service).

As previously discussed, in some example embodiments, the training module 102 is configured to train a prediction model to predict the target user's next instance of using the transportation service. The problem that the prediction model is being configured to solve can be defined as trying to estimate the probability of an instance of using a transportation service (e.g., taking a trip) a predetermined amount of time out in the future (e.g., one week in the future) for a target user given that the target user has similar instances of using the transportation service (e.g., taken similar trips) in the past. Each instance of using a transportation service (e.g., each trip) can be defined using the following attributes: an origin location (O), a destination location (D), a type of transportation service (Pr), a time of day (T), and a day of the week (W). The problem can also be represented as a joint probability of the attributes of an instance of using a transportation service P(O, D, Pr, T, W) and can be solved in a discriminative classifier setup, such as P(O, D, Pr, T, W|features).

In some example embodiments, the training module 102 is configured to train the prediction model to predict an instance of a similar use of a transportation service of the networked computer system 100 which is present in a user's history of instances of using a transportation service of the networked computer system 100. The training module 102 may use the attributes mentioned above, (O, D, Pr, T, W), to identify instances of using a transportation service of the networked computer system 100 for any target user. A combination of the above attributes can uniquely identify an instance of using a transportation service of the networked computer system 100. The training module 102 can use the aforementioned attributes to identify similar instances of using a transportation service of the networked computer system 100, such as based on a distance metric or similarity metric (e.g., cosine similarity) in 5D space, and group them together to form candidate service clusters of similar instances. One example of a candidate service cluster could be an office to home commute trip using a carpool ride share transportation service at 5 PM on every Monday, which may be expressed in the following way:

origin location (O): Office
destination location (D): Home
type of transportation service (Pr): Carpool
a time of day (T): 5:00 pm
day of the week (W): Monday The training module 102 may create the aforementioned candidate service clusters for all users and identify candidate service clusters that show strong repeat behavior. These candidate service clusters may be used for obtaining training data to train the prediction model. The training module 102 may use a repeat probability threshold r to determine whether a service cluster qualifies for use as a candidate service cluster. For example, the training module 102 may be configured to determine that, if a reference user takes n trips out of N possible trips in N weeks, the service cluster will qualify as a candidate service cluster when $n/N>r$. Now that the training module 102 has candidate service clusters, the training module 102 may construct labels for the training data by checking for service instances in (N+1)th week for each candidate service cluster.

In some example embodiments, the training module 102 is configured to identify a plurality of candidate service clusters. Each one of the candidate service clusters is defined by a corresponding service configuration. In some example embodiments, each service configuration comprises an origin location (e.g., a common starting location at which every repeated service instance of the candidate service cluster started), a destination location (e.g., a common ending location at which every repeated service instance of the candidate service cluster ended), a window of time (e.g., a common window of time within which every repeated service instance of the candidate service cluster was provided), a day of the week (e.g., a common day of the week on which every repeated service instance of the candidate service cluster was provided), and a type of transportation service (e.g., a common type of transportation service provided as part of every repeated service instance of the candidate service cluster). Each one of the candidate service clusters may be identified based on a determination that a reference user of the networked computer system 100 used the networked computer system 100 in accordance with the corresponding service configuration in a number of service instances that satisfies a repeat criteria, such as the n/N>r repeat criteria discussed above.

In some example embodiments, the training module 102 is configured to obtain training data. The training module 102 may retrieve the training data from the database(s) 108. In some example embodiments, the training data comprises, for each one of the plurality of candidate service clusters, a corresponding record of how often the reference user used the network computer system 100 in accordance with the corresponding service configuration and historical user data of the reference user indicating a plurality of instances of the reference user using the transportation service. The historical user data of the reference user may indicate a corresponding time of day and a corresponding day of the week for each one of the plurality of instances of the reference user using transportation service. Other types of data may additionally or alternatively be included in the historical user data.

FIG. 4 illustrates historical user data 400, in accordance with some example embodiments. The historical user data 400 may be stored in and retrieved from the database(s) 108. Although FIG. 4 shows historical user data 400 for only one user, USER-1, the database(s) 108 may store historical user data 400 for a plurality of users. As seen in FIG. 4, the historical user data may include a plurality of instances (e.g., INSTANCE-1, INSTANCE-2, INSTANCE-3, . . . , INSTANCE-N) of the user using a transportation service of the networked computer system 100, a corresponding origin location (e.g., ORIGIN-1, ORIGIN-2, etc.) for each instance, a corresponding destination location (e.g., DESTINATION-1, DESTINATION-2, etc.) for each instance, a corresponding time of day (e.g., 8:31 AM) for each instance, a corresponding day of the week (e.g., MONDAY) for each instance, and a corresponding type of the transportation service (e.g., PRIVATE RIDE, FOOD DELIVERY) for each instance.

In some example embodiments, the training module 102 analyzes the historical user data 400 to identify the candidate service clusters. For example, the training module 102 may determine, based on an analysis of the historical user data 400, that the reference user USER-1 repeatedly uses the transportation service of the type PRIVATE RIDE from the origin location ORIGIN-1 to the destination location DESTINATION-1 every Monday during the 8:00 AM-9:00 AM window. By identifying this repeated service configuration in the historical user data 400, the training module 102 may identify the repeated service configuration as a candidate service cluster and obtain corresponding training data based on additional analysis of additional historical user data 400 indicating how often the reference user used the service configuration when presented with the opportunity, such as how many subsequent Mondays did the reference user use the transportation service of the type PRIVATE RIDE from the origin location ORIGIN-1 to the destination location DESTINATION-1 during the 8:00 AM-9:00 AM window.

In some example embodiments, the training module 102 is configured to train the prediction model with the training data using a machine learning algorithm. The prediction model may be selected from a group of models consisting of a logistic regression model, a decision tree model, a bagging model, a boosting model, and an ensemble model. However, other types of prediction models are also within the scope of the present disclosure.

The training module 102 may be configured to train the prediction model using evaluation metrics, such as precision and recall. The training module 102 may maximize the area under the curve in the precision-recall curve, and parameter tuning may be performed against a validation data set.

In some example embodiments, the prediction module 104 is configured to receive an identification of a target user for whom a prediction is to be made, user location data indicating a location associated with the target user, prediction time data indicating a time of day and a day of the week for which a transportation service prediction is to be generated, and historical user data indicating a plurality of instances of the target user using a transportation service in association with a place. In some example embodiments, the historical user data indicates a corresponding time of day and a corresponding day of the week for each one of the plurality of instances of the target user using the transportation service. Other types of data may additionally or alternatively be included in the historical user data. The location associated with the target user may comprise a current location of the target user determined based on a current location of the computing device of the target user (e.g., a current location based on GPS technology). Alternatively, the location associated with the target user may comprise a location determined in other ways, including, but not limited to, a location identified via use of an online service check-in feature.

In some example embodiments, the prediction module 104 is configured to generate the transportation service prediction for the target user based on the identification of the target user, the user location data, the prediction time data, and the historical user data using the prediction model. The transportation service prediction indicates a probability that the target user will request the transportation service in association with the place for the time of day and the day of the week indicated by the prediction time data. In some example embodiments, the prediction module 104 uses the prediction model to generate the probability that the target user will request the transportation service in association with the place for the time of day and the day of the week indicated by the prediction time data.

In some example embodiments, the notification module 106 is configured to cause a notification, such as the notification 220 in FIG. 2, to be displayed on the computing device of the target user based on the generated probability. For example, the notification module 106 may determine whether or not the generated probability satisfies a probability threshold value, such as whether the generated probability is equal to or greater than a threshold percentage. The notification module 106 may be configured to cause the notification to be displayed on the computing device of the target user based on a determination that the generated probability satisfies the probability threshold value.

In some example embodiments, the notification module 106 is configured to base the display of the notification on one or more other factors as well, such as by requiring that one or more conditions be satisfied in order for the notification to be displayed on the computing device of the target user. One example of such a condition requirement comprises a determination that the target user has not requested the transportation service via the networked computer system 100 within a predetermined amount of time of a current time. For example, the notification module 106 may require that the target user has not requested a transportation service via the networked computer system 100 within the last two hours in order for the notification to be displayed on the computing device of the target user.

Another example of a condition requirement that may be used by the notification module 106 comprises a determination that the target user is not currently using the transportation service of the networked computer system 100. For example, the notification module 106 may require that the target user is not currently using a transportation service via the networked computer system 100 in order for the notification to be displayed on the computing device of the target user.

Yet another example of a condition requirement that may be used by the notification module 106 comprises a determination that a mobile application of the networked computer system 100 is not currently open in a foreground of the computing device of the target user. For example, the notification module 106 may require that the requester application 114 is not currently open in a foreground of the computing device of the target user in order for the notification to be displayed on the computing device of the target user.

Yet another example of a condition requirement that may be used by the notification module 106 comprises a determination that a current location of the target user is not outside of a maximum threshold distance from the place. This condition requirement ensures that the target user is not too far away from where the transportation service is to be provided. For example, the notification module 106 may require that the target user is within 30 miles of the origin location in order for the notification to be displayed on the computing device of the target user.

Yet another example of a condition requirement that may be used by the notification module 106 comprises a determination that a current location of the target user is not within a minimum threshold distance from the place. This condition requirement ensures that the target user is not so close to the destination location so as to make the recommended use of the transportation service unnecessary. For example, the notification module 106 may require that the target user be more than 500 meters from the destination location in order for the notification to be displayed on the computing device of the target user.

Yet another example of a condition requirement that may be used by the notification module 106 comprises a determination that the day of the week indicated by the prediction time data prediction time data is not included in an exclusion list. The exclusion list comprises days for which the notification should not be provided. For example, the notification module 106 may prevent a notification of a recommended use of a transportation service of the networked computer system 100 from being displayed on certain days of the week, such as on Saturday and Sunday, as well as on certain calendar dates, such as national holidays, since these days represent unique situations in which the notification may likely be irrelevant.

The networked computer system 100 may be configured to predict the user's next instance of using the transportation service based the user's environment context, such as a destination location (also referred to herein as a "place') to which the user was recently dropped off via use of a transportation service of the networked computer system 100. The networked computer system 100 may then display a notification of a recommended use of a transportation service of the networked computer system 100 based on the prediction. For example, the networked computer system 100 may detect that the target user was recently transported to a particular place, and then predict that the target user will likely request an additional use of the transportation service of the networked computer system 100 a certain amount of time after arriving at the place.

Figure 5:
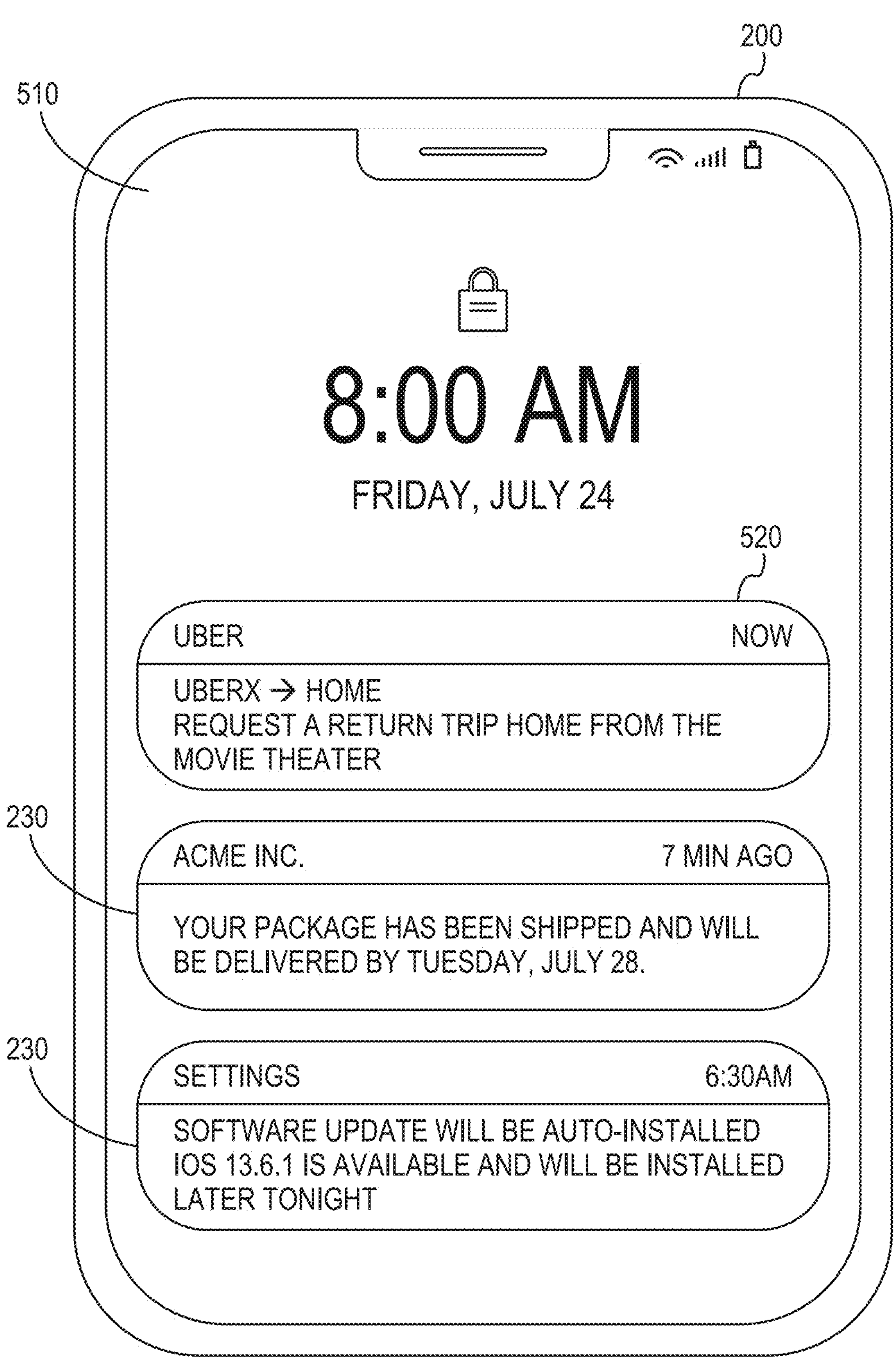
FIG. 5 illustrates a GUI within which another notification of a recommended use of a transportation service is displayed, in accordance with some example embodiments.

FIG. 5 illustrates a GUI 510 within which another notification 520 of a recommended use of a transportation service is displayed, in accordance with some example embodiments. In the example shown in FIG. 5, the user has recently been transported to and dropped off at a movie theater via a transportation service of the networked computer system 100, and the prediction module 104 has determined that the target user is likely to need a ride home at a certain time after being dropped off at the movie theater. Based on this determination, the notification module 106 has caused the notification 520 to be displayed on the computing device 200 of the target user.

In some example embodiments, the location associated with the target user on which the generation of the transportation service prediction is based comprises a destination location to which the target user was transported using the transportation service of the networked computer system 100, and the prediction module 104 generates the transportation service prediction for the target user based on a profile of the destination location stored in the database(s) 108.

FIG. 6 illustrates profiles 600 of locations (e.g., PLACE-1, PLACE-2, . . . ), in accordance with some example embodiments. The corresponding profile 600 for each location comprises corresponding feature data for the different time periods of each day. For example, the feature data may be calculated in 1 hour window buckets per day of the week, such that the profile for the location PLACE-1 comprises feature data FD-$1_{M12A\text{-}1A}$ for the time period of 12:00 AM-1:00 AM on Monday, feature data FD-$1_{M1A\text{-}2A}$ for the time period of 1:00 AM-2:00 AM on Monday, feature data FD-$1_{M2A\text{-}3A}$ for the time period of 2:00 AM-3:00 AM on Monday, and so on and so forth for every 1 hour window for every day of the week.

The feature data may comprise one or more features corresponding to users having been dropped off at the corresponding location at a time within the corresponding time period. These features may be calculated based on information about instances of uses of transportation service of the networked computer system 100. This information may be stored in and retrieved from the database(s) 108. In some example embodiments, the feature data includes an amount of time representing how long people stay at the corresponding location after arriving at the corresponding location. The amount of time may comprise a statistical measurement (e.g., median, mean) of time calculated based on corresponding amounts of time that reference users of the networked computer system 100 stayed at the location after arriving at the location. In some example embodiments, each one of the corresponding amounts of time is determined based on a corresponding drop-off time at which the corresponding reference user was dropped off at the location via the transportation service of the networked computer system 100 and a corresponding pick-up time at which the corresponding reference user was picked up at the location via the transportation service of the networked computer system 100. These drop-off and pick-up times may be retrieved from the database(s) 108.

Other features that may also be included in the feature data include, but are not limited to, a percentage breakdown of the types of vehicles or the types of transportation services used, a percentage of reference users that take a trip from the location back to the previous pick-up location from which they were recently transported, a percentage of reference users that take their next trip from the corresponding location to their home, and the percentage of reference users who use another type of transportation service (e.g., food delivery) within a certain amount of time after arriving at the corresponding location (e.g., within an hour of arriving at the place).

In some example embodiments, the notification module 106 is configured to cause the notification to be displayed on the computing device of the target user at a predetermined amount of time prior to the time of day of the prediction time data. For example, if the time of day of the prediction time data is the time at which the target user typically requests the transportation service or the time at which the target user is typically picked up as part of the requested transportation service, the notification module 106 may provide buffer time for the notification by causing the notification to be displayed 20 minutes before the time indicated by the prediction time data. In situations in which the destination location has a profile, as discussed above with respect to FIG. 7, the notification of the transportation service prediction may be caused to be displayed on the computing device of the target user at time determined based on the amount of time included in the profile of the destination location, such as by using the statistical measurement (e.g., median, mean) of time as an anchor for triggering the display of the notification. For example, the notification module 106 may be configured to determine a notification time by adding the median amount of time to the arrival time, and then subtracting a buffer amount of time (e.g., subtracting 20 minutes) to determine the notification time. The notification module 106 may then trigger the display of the notification at this calculated notification time.

In some example embodiments, the networked computer system 100 may be configured to prediction module 104 is configured to generate a transportation service prediction based on the profile of a location in response to detecting that the target user has been dropped-off at the location. The prediction module 104 may be configured to first verify that the location is not on an exclusion list of locations for which a notification should not be generated before generating a transportation service prediction and displaying a notification based on the target user being dropped off at the location. Certain locations may be excluded from such notification generation for sensitivity or privacy issues. For example, hospitals may be on the exclusion list, as it may be insensitive to display a notification prompting a target user to use a transportation service to leave a hospital. Additionally, the notification module 106 may detect that the target user is no longer within a predetermined distance of the location (e.g., via GPS technology), and therefore cancel a scheduled display of a notification based on the detection of the target user no longer being at or close to the location.

Figure 7:
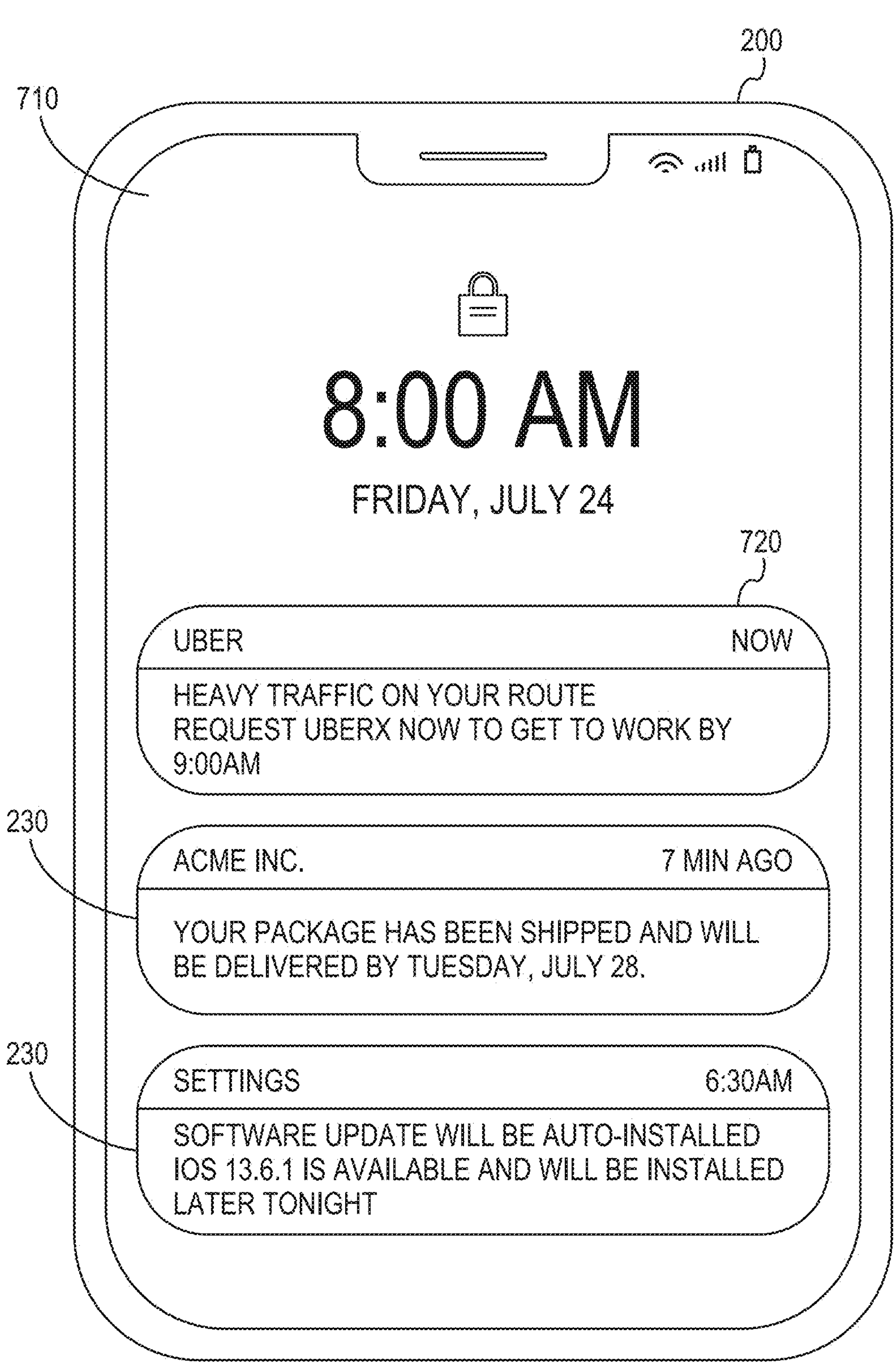
FIG. 7 illustrates a GUI within which yet another notification of a recommended use of a transportation service is displayed, in accordance with some example embodiments.

FIG. 7 illustrates a GUI 710 within which yet another notification 720 of a recommended use of a transportation service is displayed, in accordance with some example embodiments. The notification 720 includes an indication of heavy traffic on a planned route for the recommended use of the transportation service. In some example embodiments, the prediction module 104 may use factors such as traffic levels, road construction, and weather, to generate transportations service predictions and the notification module 104 may use those factors in determining at what time to cause the notification to be displayed on the computing device 200.

Figure 8:
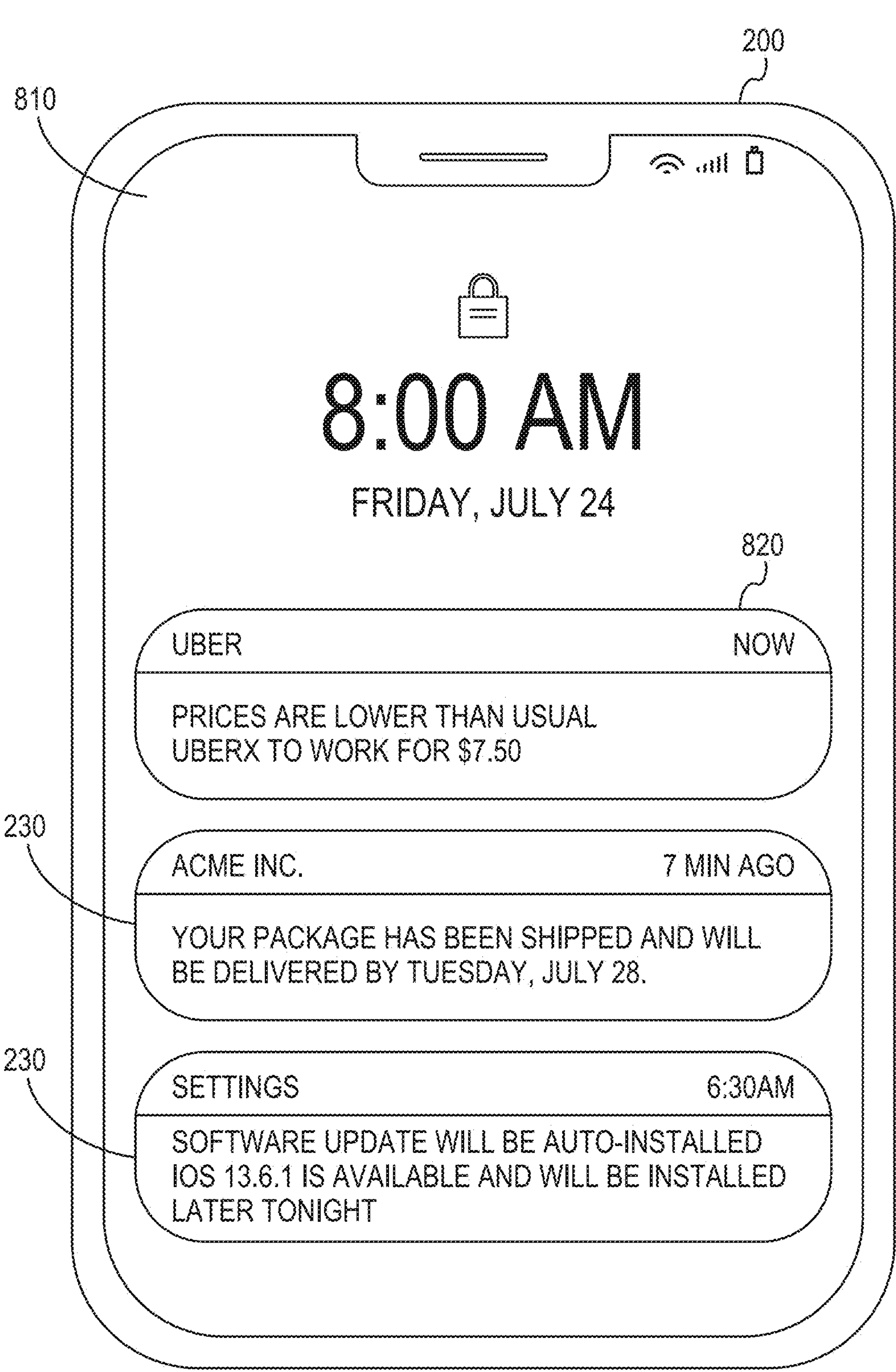
FIG. 8 illustrates a GUI within which yet another notification of a recommended use of a transportation service is displayed, in accordance with some example embodiments.

FIG. 8 illustrates a GUI 810 within which yet another notification 820 of a recommended use of a transportation service is displayed, in accordance with some example embodiments. The notification 820 includes an indication that the price for the recommended use of the transportation service is lower than usual. In some example embodiments, the prediction module 104 may use price information to generate transportations service predictions and the notification module 104 may use price information in determining at what time to cause the notification to be displayed on the computing device 200.

Figure 9:
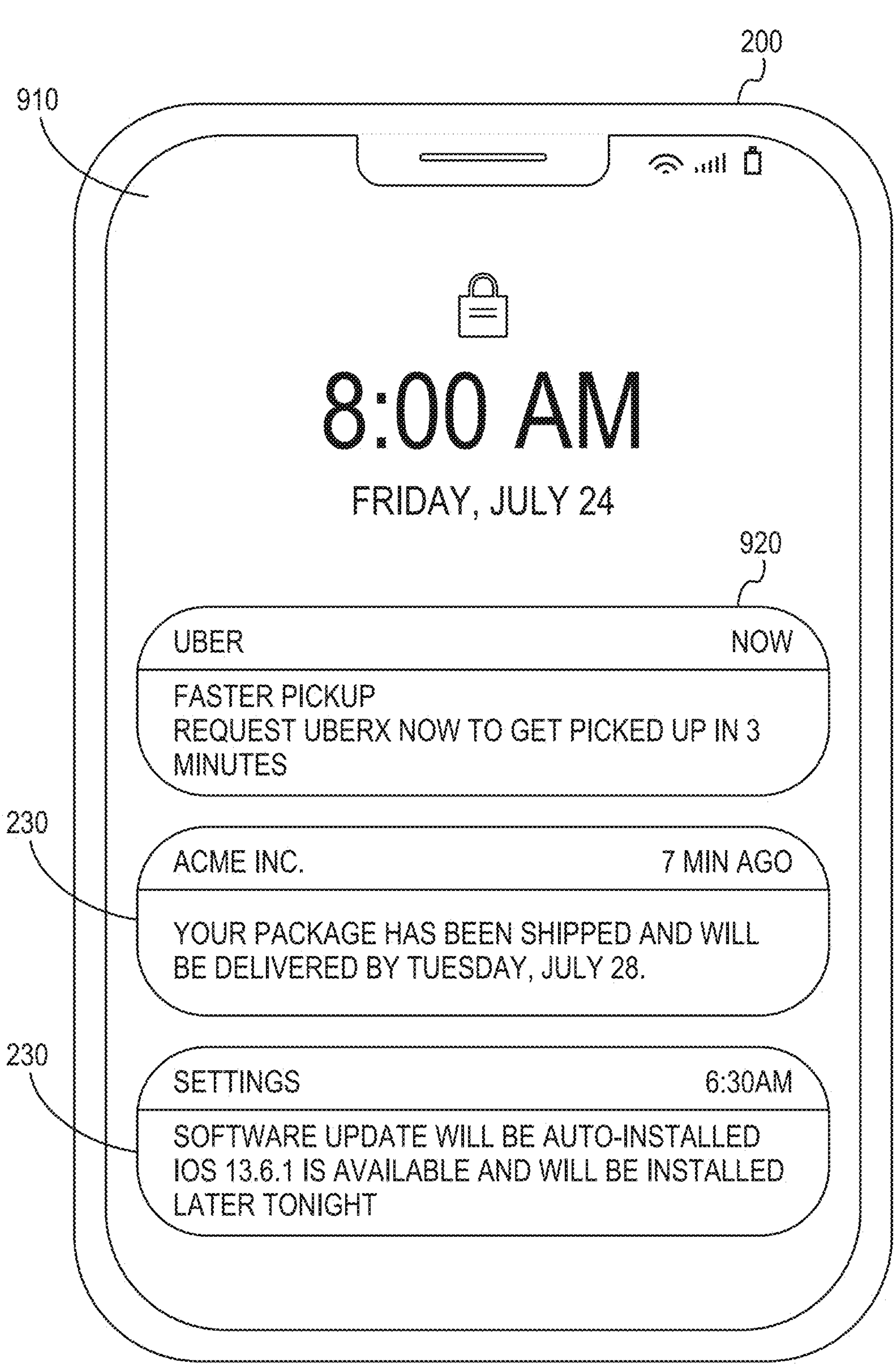
FIG. 9 illustrates a GUI within which yet another notification of a recommended use of a transportation service is displayed, in accordance with some example embodiments.

FIG. 9 illustrates a GUI 910 within which yet another notification 920 of a recommended use of a transportation service is displayed, in accordance with some example embodiments. The notification 920 includes an indication of a faster pickup time associated with the recommended use of the transportation service compared to the target user waiting until a later time to request the transportation service. In some example embodiments, the prediction module 104 may use estimated pickup times to generate transportations service predictions and the notification module 104 may use estimated pickup times in determining at what time to cause the notification to be displayed on the computing device 200.

Figure 10:
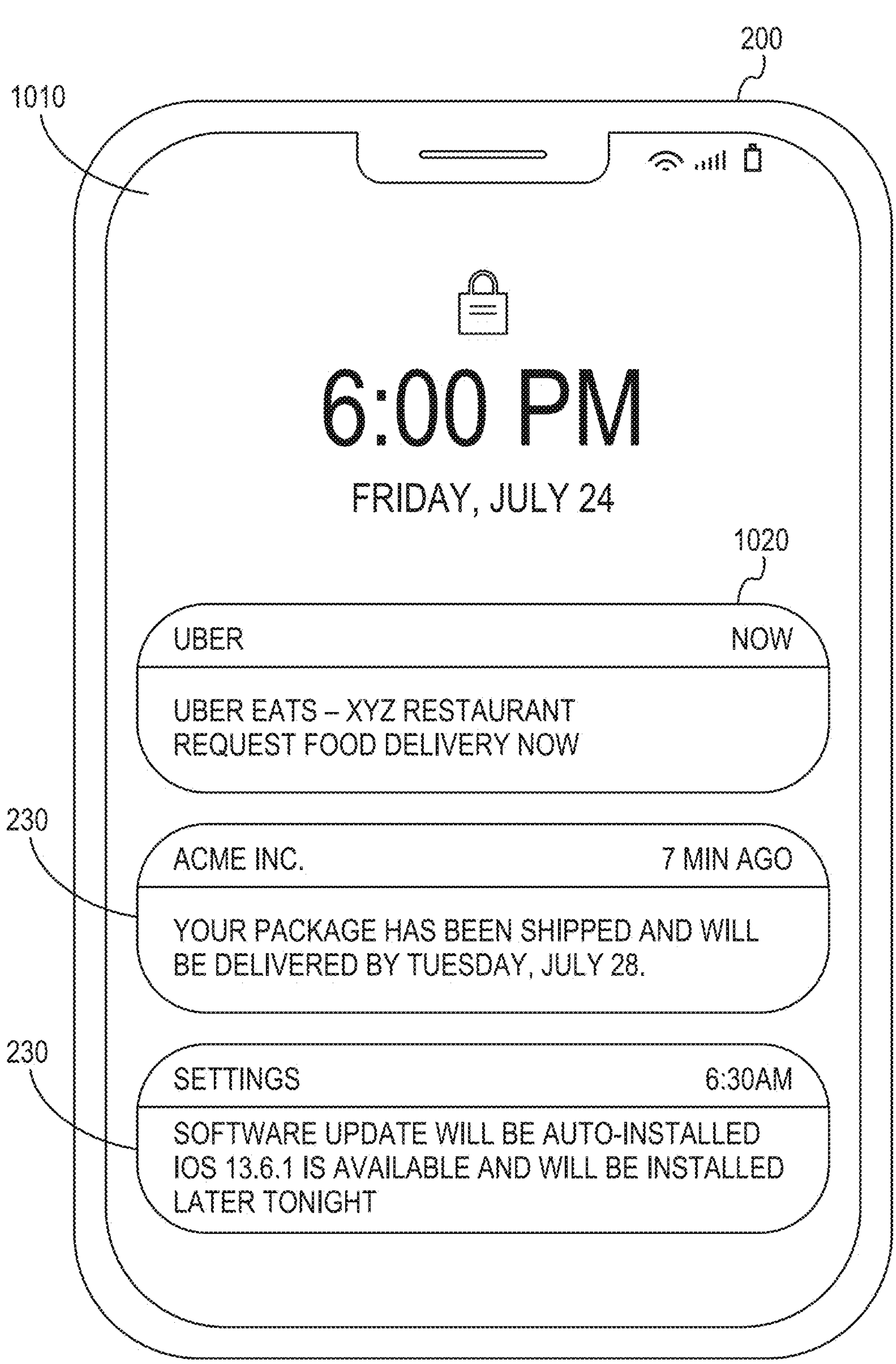
FIG. 10 illustrates a GUI within which yet another notification of a recommended use of a transportation service is displayed, in accordance with some example embodiments.

FIG. 10 illustrates a GUI 1010 within which yet another notification 1020 of a recommended use of a transportation service is displayed, in accordance with some example embodiments. In FIG. 10, the transportation service being recommended by the notification 1020 comprises food delivery from a restaurant. It is contemplated that other types of transportation services other than the transportation of people and food delivery are within the scope of the present disclosure.

Figure 11:
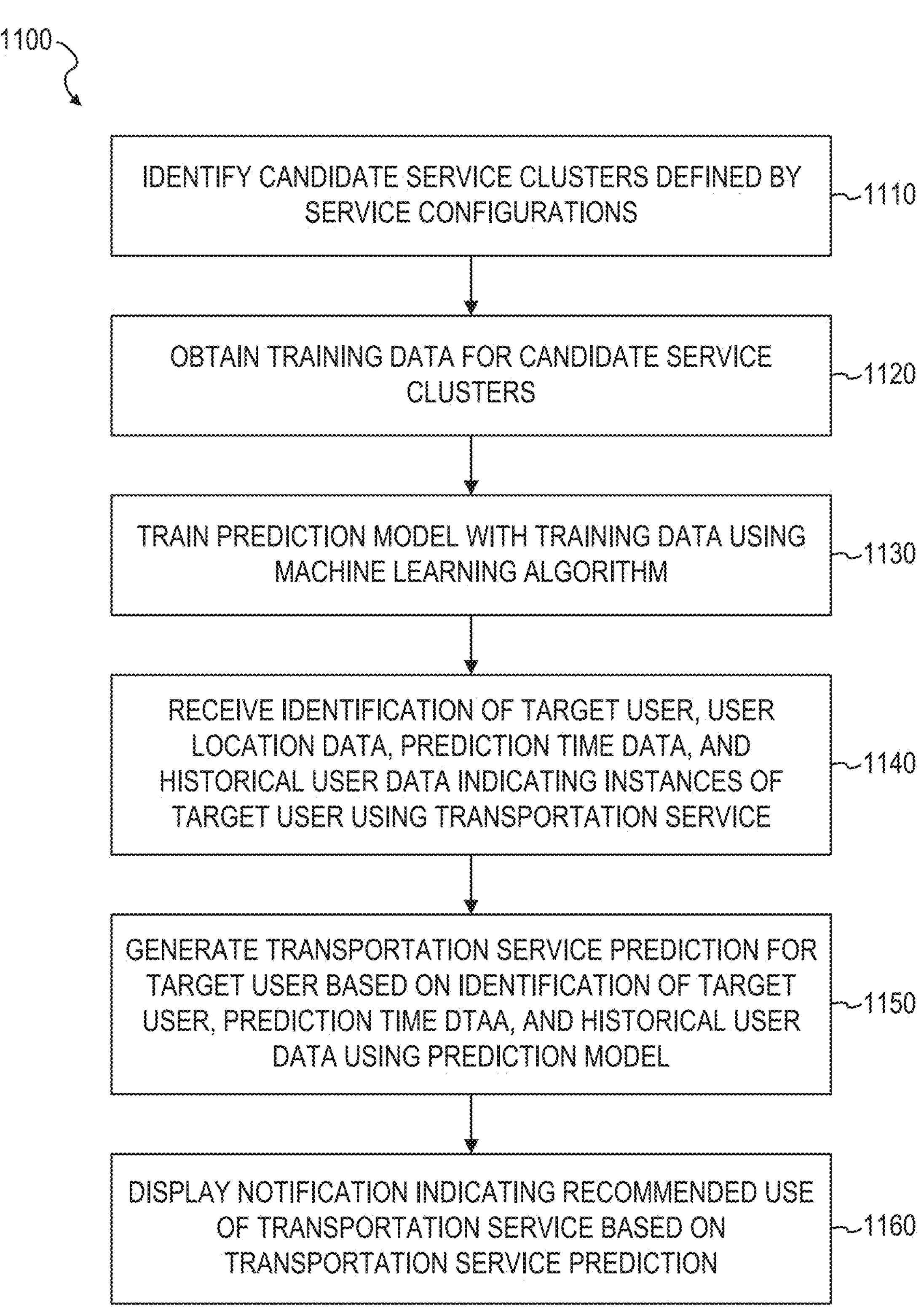
FIG. 11 is a flowchart illustrating a method of generating active notifications for users of a networked computer system using transportation service prediction, in accordance with some example embodiments.

FIG. 11 is a flowchart illustrating a method 1100 of generating active notifications for users of a networked computer system using transportation service prediction, in accordance with some example embodiments. The method 1100 can be performed by processing logic that comprises hardware (e.g., circuitry, dedicated logic, programmable logic, microcode), software (e.g., instructions run on a processing device), or a combination thereof. In one example embodiment, the method 1100 is performed by the networked computer system 100 of FIG. 1 or any combination of one or more of its components or modules (e.g., training module 102, prediction module 104, notification module 106), as described above.

At operation 1110, the networked computer system 100 identifies a plurality of candidate service clusters. Each one of the candidate service clusters is defined by a corresponding service configuration. In some example embodiments, each service configuration comprises an origin location, a destination location, a window of time, a day of the week, and a type of transportation service (e.g., transportation of a person, transportation of one or more goods). Each one of the candidate service clusters may be identified based on a determination that a reference user of the networked computer system 100 used the networked computer system 100 in accordance with the corresponding service configuration in a number of service instances that satisfies a repeat criteria, as previously discussed with respect to the features and functionality of the training module 102.

At operation 1120, the networked computer system 100 obtains training data. For example, the networked computer system 100 may retrieve the training data from the database(s) 108. In some example embodiments, the training data comprises, for each one of the plurality of candidate service clusters, a corresponding record of how often the reference user used the network computer system 100 in accordance with the corresponding service configuration and historical user data of the reference user indicating a plurality of instances of the reference user using the transportation service. The historical user data of the reference user may indicate a corresponding time of day and a corresponding day of the week for each one of the plurality of instances of the reference user using transportation service. Other types of data may additionally or alternatively be included in the historical user data.

At operation 1130, the networked computer system 100 trains the prediction model with the training data using a machine learning algorithm. In some example embodiments, the prediction model is selected from a group of models consisting of a logistic regression model, a decision tree model, a bagging model, a boosting model, and an ensemble model. However, other types of prediction models are also within the scope of the present disclosure.

At operation 1140, the networked computer system 100 receives an identification of a target user, user location data indicating a location associated with the target user, prediction time data indicating a time of day and a day of the week for which a transportation service prediction is to be generated, and historical user data indicating a plurality of instances of the target user using a transportation service in association with a place, as previously discussed with respect to the features and functionality of the prediction module 104. In some example embodiments, the historical user data indicates a corresponding time of day and a corresponding day of the week for each one of the plurality of instances of the target user using the transportation service. Other types of data may additionally or alternatively be included in the historical user data. The location associated with the target user may comprise a current location of the target user determined based on a current location of the computing device of the target user (e.g., a current location based on GPS technology). Alternatively, the location associated with the target user may comprise a location determined in other ways, including, but not limited to, a location identified via use of an online service check-in feature.

At operation 1150, the networked computer system 100 generates the transportation service prediction for the target user based on the identification of the target user, the user location data, the prediction time data, and the historical user data using a prediction model. The transportation service prediction indicates a probability that the target user will request the transportation service in association with the place for the time of day and the day of the week indicated by the prediction time data. In some example embodiments, the location associated with the target user comprises a destination location to which the target user was transported using the transportation service of the networked computer system, and the generating of the transportation service prediction for the target user is further based on a profile of the destination location stored in a database. The profile of the destination location may include an amount of time representing how long people stay at the destination location after arriving at the destination location. In some example embodiments, the amount of time comprises a statistical measurement (e.g., median, mean) of time calculated based on corresponding amounts of time that reference users of the networked computer system stayed at the destination location, with each one of the corresponding amounts of time being determined based on a corresponding drop-off time at which the corresponding reference user was dropped off at the destination location via the transportation service of the networked computer system and a corresponding pick-up time at which the corresponding reference user was picked up at the destination location via the transportation service of the networked computer system.

At operation 1160, the networked computer system 100 causes a notification to be displayed on a computing device of the target user based on the transportation service prediction for the target user, as previously discussed with respect to the features and functionality of the notification module 106. The notification indicates a recommended use of the transportation service in association with the place for the time of day and the day of the week indicated by the prediction time data. In some example embodiments, the notification comprises a selectable user interface element configured to enable the target user to submit an electronic request for the transportation service in association with the place for the time of day and the day of the week indicated by the prediction time data. In some example embodiments, the selectable user interface element of the notification is configured to, in response to its selection, automatically configure the electronic request for the transportation service, as previously discussed and shown with respect to FIGS. 2-3.

The notification of the transportation service prediction may be caused to be displayed on the computing device of the target user at a predetermined amount of time prior to the time of day of the prediction time data. In situations in which the destination location has a profile, as discussed above with respect to FIG. 6, the notification of the transportation service prediction may be caused to be displayed on the computing device of the target user at time determined based on the amount of time included in the profile of the destination location, as previously discussed.

In some example embodiments, the generating the transportation service prediction, at operation 1150, comprises using the prediction model to generate the probability that the target user will request the transportation service in association with the place for the time of day and the day of the week indicated by the prediction time data. The notification may be caused to be displayed on the computing device of the target user based on the generated probability. In some example embodiments, the causing the notification to be displayed on the computing device of the target user comprises determining that the generated probability satisfies a probability threshold value, and then causing the notification to be displayed on the computing device of the target user based on the determination that the generated probability satisfies the probability threshold value.

The notification may be caused to be displayed on the computing device based on one or more factors other than the generated probability as well. In some example embodiments, the causing the notification to be displayed on the computing device of the target user is further based on a determination that the target user has not requested the transportation service via the networked computer system within a predetermined amount of time of a current time. In some example embodiments, the causing the notification to be displayed on the computing device of the target user is further based on a determination that the target user is not currently using the transportation service of the networked computer system. In some example embodiments, the causing the notification to be displayed on the computing device of the target user is further based on a determination that a mobile application of the networked computer system is not currently open in a foreground of the computing device of the target user. In some example embodiments, the causing the notification to be displayed on the computing device of the target user is further based on a determination that a current location of the target user is not outside of a maximum threshold distance from the place. In some example embodiments, the causing the notification to be displayed on the computing device of the target user is further based on a determination that a current location of the target user is not within a minimum threshold distance from the place. In some example embodiments, the causing the notification to be displayed on the computing device of the target user is further based on a determination that the day of the week indicated by the prediction time data prediction time data is not included in an exclusion list, with the exclusion list comprising at least one day of the week or at least one calendar date on which the notification is to be prevented from being displayed to the target user. Other types of factors may additionally or alternatively be used as conditional requirements for causing the notification to be displayed on the computing device of the target user.

It is contemplated that any of the other features described within the present disclosure can be incorporated into the method 1200.

It is contemplated that any features of any embodiments disclosed herein can be combined with any other features of any other embodiments disclosed herein. Accordingly, these any such hybrid embodiments are within the scope of the present disclosure.

Example Mobile Device

Figure 12:
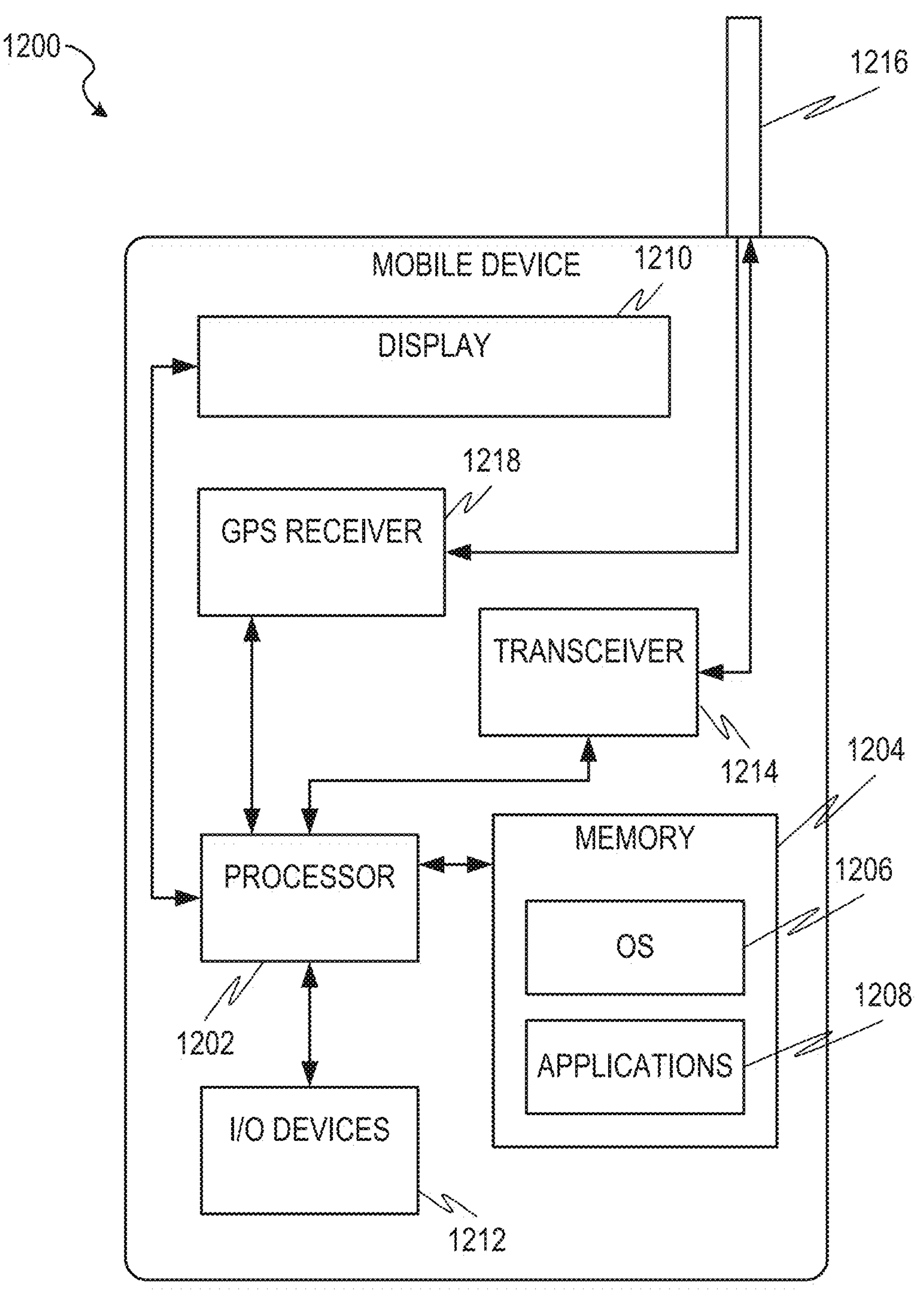
FIG. 12 is a block diagram illustrating a mobile device, in accordance with some example embodiments.

FIG. 12 is a block diagram illustrating a mobile device 1200, according to an example embodiment. The mobile device 1200 can include a processor 1202. The processor 1202 can be any of a variety of different types of commercially available processors suitable for mobile devices 1200 (for example, an XScale architecture microprocessor, a Microprocessor without Interlocked Pipeline Stages (MIPS) architecture processor, or another type of processor). A memory 1204, such as a random access memory (RAM), a Flash memory, or other type of memory, is typically accessible to the processor 1202. The memory 1204 can be adapted to store an operating system (OS) 1206, as well as application programs 1208, such as a mobile location-enabled application that can provide location-based services (LBSs) to a user. The processor 1202 can be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 can be coupled to a transceiver 1214 that interfaces with an antenna 1216. The transceiver 1214 can be configured to both transmit and receive cellular network signals, wireless data signals, or other types of signals via the antenna 1216, depending on the nature of the mobile device 1200. Further, in some configurations, a GPS receiver 1218 can also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
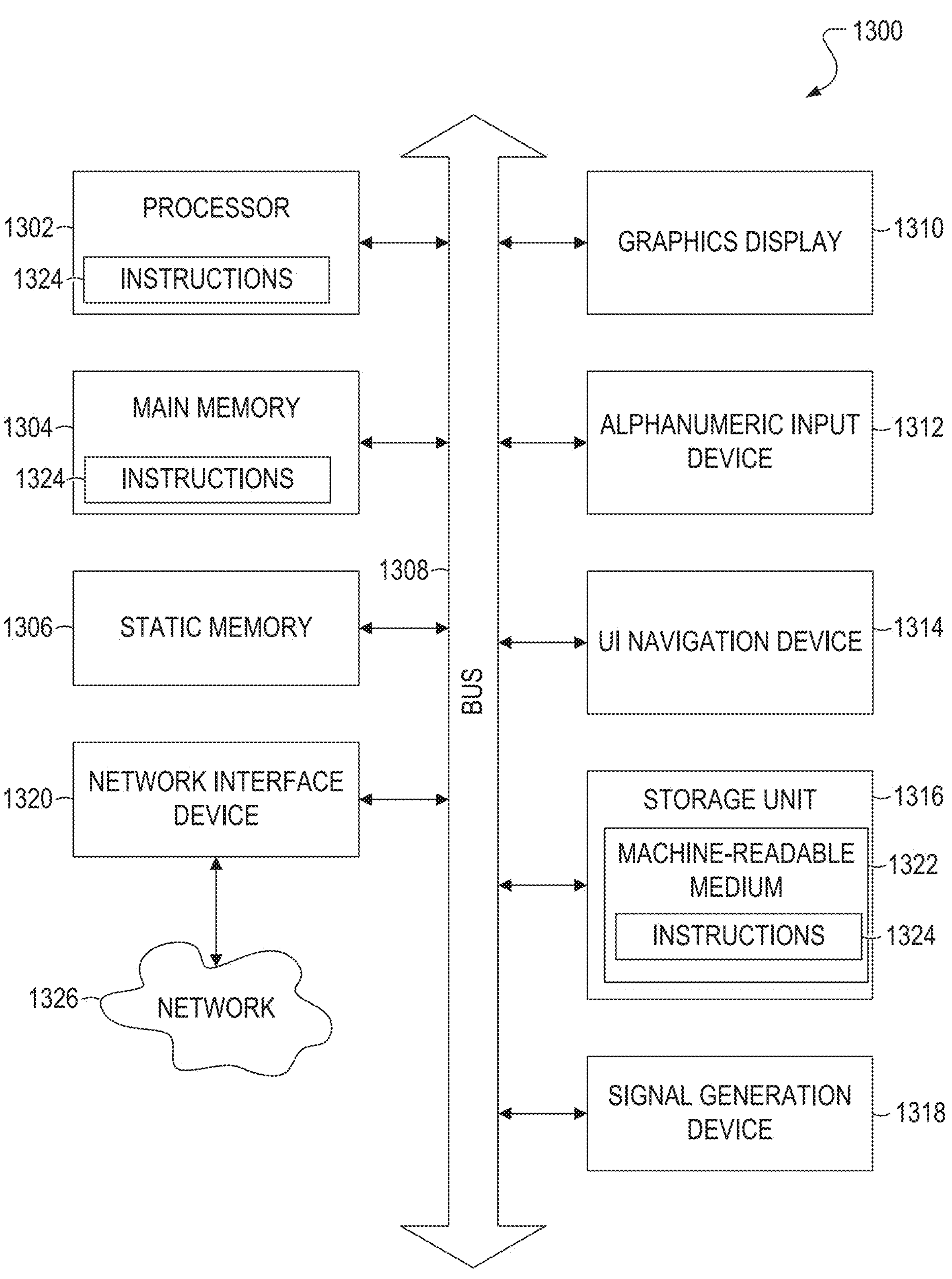
FIG. 13 is a diagrammatic representation of a machine in the form of a computer system within which a set of instructions may be executed for causing the machine to perform any one or more of the methodologies discussed herein, according to an example embodiment.

FIG. 13 is a block diagram of an example computer system 1300 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a graphics display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a storage unit 1316, a signal generation device 1318 (e.g., a speaker) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions (e.g., instructions 1324) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Executable Instructions and Machine-Storage Medium

The various memories (i.e., 1304, 1306, and/or memory of the processor(s) 1302) and/or storage unit 1316 may store one or more sets of instructions and data structures (e.g., software) 1324 embodying or utilized by any one or more of the methodologies or functions described herein. These instructions, when executed by processor(s) 1302 cause various operations to implement the disclosed embodiments.

As used herein, the terms "machine-storage medium," "device-storage medium," "computer-storage medium" (referred to collectively as "machine-storage medium 1322") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1322 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1322 specifically exclude carrier waves, modulated data signals, and other such media, at least some of which are covered under the term "signal medium" discussed below.

Signal Medium

The term "signal medium" or "transmission medium" in this disclosure shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Numbered Examples of Embodiments

The following numbered examples are embodiments.

1. A computer-implemented method performed by a computer system having at least one hardware processor, the computer-implemented method comprising:

receiving an identification of a target user, user location data indicating a location associated with the target user, prediction time data indicating a time of day and a day of the week for which a transportation service prediction is to be generated, and historical user data indicating a plurality of instances of the target user using a transportation service in association with a place, the historical user data indicating a corresponding time of day and a corresponding day of the week for each one of the plurality of instances of the target user using the transportation service;

generating the transportation service prediction for the target user based on the identification of the target user, the user location data, the prediction time data, and the historical user data using a prediction model, the transportation service prediction indicating a probability that the target user will request the transportation service in association with the place for the time of day and the day of the week indicated by the prediction time data; and causing a notification to be displayed on a computing device of the target user based on the transportation service prediction for the target user, the notification indicating a recommended use of the transportation service in association with the place for the time of day and the day of the week indicated by the prediction time data, and the notification comprising a selectable user interface element configured to enable the target user to submit an electronic request for the transportation service in association with the place for the time of day and the day of the week indicated by the prediction time data.

2. The computer-implemented method of example 1, further comprising:

identifying a plurality of candidate service clusters, each one of the candidate service clusters being defined by a corresponding service configuration, the corresponding service configuration comprising an origin location, a destination location, a window of time, a day of the week, and a type of transportation service, and each one of the candidate service clusters being identified based on a determination that a reference user of the networked computer system used the networked computer system in accordance with the corresponding service configuration in a number of service instances that satisfies a repeat criteria;

obtaining training data comprising, for each one of the plurality of candidate service clusters, a corresponding record of how often the reference user used the network computer system in accordance with the corresponding service configuration and historical user data of the reference user indicating a plurality of instances of the reference user using the transportation service, the historical user data of the reference user indicating a corresponding time of day and a corresponding day of the week for each one of the plurality of instances of the reference user using transportation service; and training the prediction model with the training data using a machine learning algorithm.

3. The computer-implemented method of example 1 or example 2, wherein the location associated with the target user comprises a current location of the target user determined based on a current location of the computing device of the target user.

4. The computer-implemented method of any one of examples 1 to 3, wherein the transportation service comprises transportation of a person or transportation of one or more goods.

5. The computer-implemented method of examples 4, wherein the prediction model is selected from a group of models consisting of a logistic regression model, a decision tree model, a bagging model, a boosting model, and an ensemble model.

6. The computer-implemented method of any one of examples 1 to 5, wherein:

the generating the transportation service prediction comprises using the prediction model to generate the probability that the target user will request the transportation service in association with the place for the time of day and the day of the week indicated by the prediction time data;

the causing the notification to be displayed on the computing device of the target user comprises determining that the generated probability satisfies a probability threshold value; and the causing the notification to be displayed on the computing device of the target user is further based on the determination that the generated probability satisfies the probability threshold value.

7. The computer-implemented method of any one of examples 1 to 6, wherein the causing the notification to be displayed on the computing device of the target user is further based on a determination that the target user has not requested the transportation service via the networked computer system within a predetermined amount of time of a current time.

8. The computer-implemented method of any one of examples 1 to 7, wherein the causing the notification to be displayed on the computing device of the target user is further based on a determination that the target user is not currently using the transportation service of the networked computer system.

9. The computer-implemented method of any one of examples 1 to 8, wherein the causing the notification to be displayed on the computing device of the target user is further based on a determination that a mobile application of the networked computer system is not currently open in a foreground of the computing device of the target user.

10. The computer-implemented method of any one of examples 1 to 9, wherein the causing the notification to be displayed on the computing device of the target user is further based on a determination that a current location of the target user is not outside of a maximum threshold distance from the place.

11. The computer-implemented method of any one of examples 1 to claim 10, wherein the causing the notification to be displayed on the computing device of the target user is further based on a determination that a current location of the target user is not within a minimum threshold distance from the place.

12. The computer-implemented method of any one of examples 1 to claim 11, wherein the causing the notification to be displayed on the computing device of the target user is further based on a determination that the day of the week indicated by the prediction time data prediction time data is not included in an exclusion list, the exclusion list comprising at least one day of the week or at least one calendar date on which the notification is to be prevented from being displayed to the target user.

13. The computer-implemented method of any one of examples 1 to claim 12, wherein the selectable user interface element of the notification is configured to, in response to its selection, automatically configure the electronic request for the transportation service.

14. The computer-implemented method of any one of examples 1 to claim 13, wherein the location associated with the target user comprises a destination location to which the target user was transported using the transportation service of the networked computer system, the generating of the transportation service prediction for the target user being further based on a profile of the destination location stored in a database.

15. The computer-implemented method of any one of examples 1 to claim 14, wherein the profile of the destination location includes an amount of time representing how long people stay at the destination location after arriving at the destination location.

16. The computer-implemented method of any one of examples 1 to claim 15, wherein the amount of time comprises a statistical measurement of time calculated based on corresponding amounts of time that reference users of the networked computer system stayed at the destination location, each one of the corresponding amounts of time being determined based on a corresponding drop-off time at which the corresponding reference user was dropped off at the destination location via the transportation service of the networked computer system and a corresponding pick-up time at which the corresponding reference user was picked up at the destination location via the transportation service of the networked computer system.

17. The computer-implemented method of any one of examples 1 to claim 16, wherein the notification of the transportation service prediction is caused to be displayed on the computing device of the target user at time determined based on the amount of time included in the profile of the destination location.

18. The computer-implemented method of any one of examples 1 to claim 17, wherein the notification of the transportation service prediction is caused to be displayed on the computing device of the target user at a predetermined amount of time prior to the time of day of the prediction time data.

19. A system comprising:

at least one hardware processor; and a machine-readable medium embodying a set of instructions that, when executed by the at least one hardware processor, cause the at least one hardware processor to perform the method of any one of examples 1 to 18.

20. A machine-readable medium embodying a set of instructions that, when executed by the at least one hardware processor, cause the at least one hardware processor to perform the method of any one of examples 1 to 18.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by at least one hardware processor, the computer-implemented method comprising:

detecting a current location of a target user via a GPS signal received from a mobile device of the target user;

generating, using a prediction model, a transportation service prediction based on the current location of the target user and historical user data indicating repeat trip behavior of the target user, the transportation service prediction indicating a probability that the target user will request a transportation service in association with a place for a given time of day and day of the week; and based on the probability that the target user will request the transportation service, and determining that the current location is between a minimum threshold distance from the place and a maximum threshold distance from the place, transmitting a notification from a networked computer system to the mobile device of the target user causing display of the notification comprising a selectable user interface element configured to enable the target user to submit an electronic request for the transportation service in association with the place.

2. The computer-implemented method of claim 1, further comprising:

identifying a plurality of candidate service clusters, each one of the plurality of candidate service clusters being defined by a corresponding service configuration, the corresponding service configuration comprising an origin location, a destination location, a window of time, a day of the week, and a type of transportation service, and each one of the plurality of candidate service clusters being identified based on a determination that a reference user of the networked computer system used the networked computer system in accordance with the corresponding service configuration in a number of service instances that satisfies a repeat criteria;

obtaining training data comprising, for each one of the plurality of candidate service clusters, a corresponding record of how often the reference user used a network computer system in accordance with the corresponding service configuration and historical user data of the reference user indicating a plurality of instances of the reference user using the transportation service, the historical user data of the reference user indicating a corresponding time of day and a corresponding day of the week for each one of the plurality of instances of the reference user using transportation service; and training the prediction model with the training data using a machine learning algorithm.

3. The computer-implemented method of claim 1, wherein the transportation service comprises transportation of a person or transportation of one or more goods.

4. The computer-implemented method of claim 1, wherein the prediction model is selected from a group of models consisting of a logistic regression model, a decision tree model, a bagging model, a boosting model, and an ensemble model.

5. The computer-implemented method of claim 1, further comprising:

determining that the probability that the target user will request the transportation service satisfies a probability threshold value; and wherein transmitting the notification is further based on the determination that the probability satisfies the probability threshold value.

6. The computer-implemented method of claim 1, wherein transmitting the notification is further based on a determination that the target user has not requested the transportation service via the networked computer system within a predetermined amount of time of a current time.

7. The computer-implemented method of claim 1, wherein transmitting the notification is further based on a determination that the target user is not currently using the transportation service of the networked computer system.

8. The computer-implemented method of claim 1, wherein transmitting the notification is further based on a determination that a mobile application of the networked computer system is not currently open in a foreground of the mobile device of the target user.

9. The computer-implemented method of claim 1, wherein transmitting the notification is further based on a determination that the day of the week is not included in an exclusion list, the exclusion list comprising at least one day of the week or at least one calendar date on which the notification is to be prevented from being displayed to the target user.

10. The computer-implemented method of claim 1, wherein the selectable user interface element of the notification is configured to, in response to its selection, automatically configure the electronic request for the transportation service.

11. The computer-implemented method of claim 1, wherein the notification is displayed on a lock screen of the mobile device.

12. The computer-implemented method of claim 1, wherein transmitting the notification is further based on a determination that the target user has not requested the transportation service via the networked computer system within a predetermined amount of time of a current time.

13. The computer-implemented method of claim 1, wherein the probability that the target user will request a transportation service in association with a place is further based on a profile of the place.

14. The computer-implemented method of claim 13, wherein the profile of the place includes an amount of time representing how long people stay at the place after arriving at the place, the amount of time comprising a statistical measurement of time calculated based on corresponding amounts of time that reference users of the networked computer system stayed at the current location.

15. The computer-implemented method of claim 14, wherein each of the corresponding amounts of time is determined based on a corresponding drop-off time at which a corresponding reference user was dropped off at the place via a transportation service and a corresponding pick-up time at which the corresponding reference user was picked up at the place via the transportation service.

16. A system comprising:

at least one hardware processor; and a non-transitory machine storage medium embodying a set of instructions that, when executed by the at least one hardware processor, cause the at least one hardware processor to perform operations comprising:

detecting a current location of a target user via a GPS signal received from a mobile device of the target user;

generating, using a prediction model, a transportation service prediction based on the current location of the target user and historical user data indicating repeat trip behavior of the target user, the transportation service prediction indicating a probability that the target user will request a transportation service in association with a place for a given time of day and day of the week; and based on the probability that the target user will request the transportation service, and determining that the current location is between a minimum threshold distance from the place and a maximum threshold distance from the place, transmitting a notification from a networked computer system to the mobile device of the target user causing display of the notification comprising a selectable user interface element configured to enable the target user to submit an electronic request for the transportation service in association with the place.

17. The system of claim 16, the operations further comprising:

identifying a plurality of candidate service clusters, each one of the plurality of candidate service clusters being defined by a corresponding service configuration, the corresponding service configuration comprising an origin location, a destination location, a window of time, a day of the week, and a type of transportation service, and each one of the plurality of candidate service clusters being identified based on a determination that a reference user of the networked computer system used the networked computer system in accordance with the corresponding service configuration in a number of service instances that satisfies a repeat criteria;

obtaining training data comprising, for each one of the plurality of candidate service clusters, a corresponding record of how often the reference user used a network computer system in accordance with the corresponding service configuration and historical user data of the reference user indicating a plurality of instances of the reference user using the transportation service, the historical user data of the reference user indicating a corresponding time of day and a corresponding day of the week for each one of the plurality of instances of the reference user using transportation service; and training the prediction model with the training data using a machine learning algorithm.

18. The system of claim 16, wherein the transportation service comprises transportation of a person or transportation of one or more goods.

19. The system of claim 16, wherein transmitting the notification is further based on a determination that the target user is not currently using the transportation service of the networked computer system.

20. A non-transitory machine storage medium embodying a set of instructions that, when executed by at least one hardware processor, cause the at least one hardware processor to perform operations comprising:

detecting a current location of a target user via a GPS signal received from a mobile device of the target user;

generating, using a prediction model, a transportation service prediction based on the current location of the target user and historical user data indicating repeat trip behavior of the target user, the transportation service prediction indicating a probability that the target user will request a transportation service in association with a place for a given time of day and day of the week; and based on the probability that the target user will request the transportation service, and determining that the current location is between a minimum threshold distance from the place and a maximum threshold distance from the place, transmitting a notification from a networked computer system to the mobile device of the target user causing display of the notification comprising a selectable user interface element configured to enable the target user to submit an electronic request for the transportation service in association with the place.

* * * * *